Patented July 10, 1945

2,380,141

UNITED STATES PATENT OFFICE 2,380,141

ROSIN MODIFICATION

László Auer, South Orange, N. J., assignor to Ridbo Laboratories, Inc., Paterson, N. J., a corporation of New Jersey No Drawing. Application October 12, 1942,
Serial No. 461,793

1 Claim. (Cl. 260—106)

*General field of invention and statement of objects*

This invention relates to treatment of rosin, and especially to treatment with certain modifying agents promoting decarboxylation and/or softening or liquefaction of rosin. The present application is a continuation-in-part of my copending application Serial No. 318,650, filed February 12, 1940 (now Patent No. 2,298,270).

As is known, gum or wood rosins contain mixtures of rosin acids, known today as abietic acid, pyro-abietic acid and d-pimaric acid amongst others. Such rosins commonly have an acid value of from about 145 to 185, usually from about 160 to about 168, and in their natural state they are ordinarily hard, brittle materials, of melting point from about 70° C. to about 85° C.

Rosin is a valuable raw material for a number of commercial purposes, such as in paper sizing, soap manufacture, and especially in the coatings and plastics industries. There are, in fact, a number of examples in the art of use of various rosin derivatives for purposes such as those mentioned. Some of the most important and common examples occur in the coatings industry, i. e., use of rosin derivatives in paints, varnishes and the like.

In its natural state, however, rosin is not well suited to many commercial purposes for which it is potentially a valuable raw material.

The primary object of the present invention is to modify various physical properties of rosin, whereby to produce modified rosin products which are better adapted to many uses for which rosin or rosin derivatives are now employed. In addition, the modifications brought about in accordance with the present invention make it possible and advantageous to use the modified rosin products for many purposes for which rosin in its natural state and also various derivatives thereof are not well suited.

To illustrate, reference is made to coating compositions, such as varnishes. In its natural state, rosin is a brittle material and therefore yields a brittle film when employed alone as varnish solids. Thus, rosin in its natural state does not have film forming characteristics such that it may satisfactorily be employed alone as vehicle solids in a coating composition. According to this invention modifications are brought about in the rosin so as to secure a rosin product having drying or film forming characteristics which are well suited to the coating composition industry, thereby even making possible employment of the modified rosin products alone as vehicle solids in varnishes and the like. Usually, however, at least some drying or semi-drying oil is advantageously used with the modified products.

Because of the improved properties of the modified rosin products, such products may be employed as a replacement ingredient, in substantial proportions, for linseed or other drying or semi-drying oils in paints and other coating and plastic compositions.

For certain special purposes in the soap and paper sizing industries, the modified rosin products of this invention may also be of advantage, notwithstanding the fact that the modified products have a reduced acid value.

One of the most important modifications brought about by the process of the invention is the decarboxylation and/or softening or liquefying of the rosin, i. e., at least some reduction of brittleness or in melting point, or both. In addition, the process of the invention is notable in its effect on the acid value, the invention providing for reduction in acid value, as will further appear. In referring to changes of this type and in making comparisons of the modified products with products not treated with modifying agents, it is to be understood that the statements regarding changes and comparisons are always made on the basis of a relation between the product treated with a modifying agent and a product treated in exactly the same manner (heating, etc.) but without a modifying agent. The latter is often herein referred to as a "blank" or "control" experiment.

According to the invention, by appropriate control of treatment conditions, and by appropriate selection of materials, the degree of decarboxylation and/or softening or liquefaction and also the acid value may be regulated to meet various different requirements. For instance, according to the invention, it is possible to soften the rosin, or to lower the acid value, or both.

Although the invention is not limited thereto, it is sometimes of importance and advantage to subject the rosin to treatment for a time and under conditions such as to change the physical character of the rosin from its natural hard and brittle condition to a consistency approximating the so-called "cold flow," i. e., a consistency according to which the material will gradually flow at normal room temperatures, so that if a blob of the modified rosin is placed on a flat surface, it will more or less gradually flatten out, often at a rate which is not observable with the eye. For many purposes a liquefaction at least to this degree is desirable.

For certain purposes it is advantageous that the rosin be liquefied even to the extent of becoming a mobile liquid, similar, for instance, to the consistency of certain oils, such as bodied linseed oil.

My preferred range of liquefaction extends from about the consistency of a viscous oil to about the cold flow consistency above mentioned, although it is to be understood that a greater or a lesser degree of liquefaction is also contemplated.

The modification process

The process of the invention involves heating the rosin in the presence of a modifying agent of the type mentioned hereinafter, the duration of heating, temperature and other treatment conditions, as more fully explained herebelow, being controlled in accordance with the extent and type of modification desired.

In general, modifying agents employed in accordance with this invention, and also in accordance with certain of my copending applications, identified hereinafter, are polar compounds. The present application is particularly directed to the use of organic halogen compounds, as modifying agents for rosin. The compounds of the class just mentioned may be considered as two-radical type compounds, by which I mean compounds having within the molecule an acidic inorganic halogen-containing residue, and an organic residue, the inorganic residue being capable, upon the addition of hydrogen, of yielding a halogen-containing acid. Conditions capable of bringing about this change may be present during the process.

With reference to the yielding of a halogen-containing acid, it may be mentioned that although I believe that that reaction takes place during the treatment of the rosin, in some cases the reaction may not occur to any considerable extent. Nevertheless, the treating agents herein contemplated are effective, so long as they have the capability of yielding the corresponding halogen-containing acid, upon the addition of hydrogen or water to the inorganic residue. It may be noted that with some compounds in this group, the corresponding halogen-containing acid may merely be split-off from the compound, in which event application of heat alone may be sufficient to yield the acid.

In treating with the agents herein contemplated, precautions should be taken to prevent excessive loss of the reagent before ample opportunity has been given for the rosin to absorb it. This may be accomplished by employment of a reflux condenser or in any other suitable way.

In the modifying agents of the group herein claimed, good results are secured where the inorganic residue contains chlorine, bromine or iodine, yielding, upon the addition of hydrogen, hydrochloric acid, hydrobromic acid or hydriodic acid.

The following specific examples are illustrative of this class of treating agents:

o-Dichlorobenzene
p-Dichlorobenzene
Trichlorobenzene
Naphthalene tetrachloride
Naphthalene trichloride
Naphthalene monochloride
Naphthalene hexachloride
Chloral hydrate
Iodoform
Pinene hydrochloride
4-chloro-o-anisidine
p-Nitro-chloro-benzene
Triphenyl chloro-methane
Benzyl chloride
Benzoyl chloride
Acetyl chloride
Mono-chloroacetic acid
Trichloroacetic acid
2-chloro-anthraquinone
2,2,3-trichlorobutyric acid
Pentachloropentane
Tetrachloro-resorcinol
b-Chloroanthraquinone
Tetrabromofluorescein It will be noted that some of these are aromatic and some aliphatic.

Some of the inorganic salts of organic bases also have the important characteristics of the class of treating agents herein claimed. Examples are as follows:

Diphenylamine hydrochloride
Diphenylamine hydrobromide
m-Nitroaniline hydrochloride
Trichloroaniline hydrochloride
Aniline hydrochloride
Diphenylamine trichloracetate With agents of this group the acid may be yielded merely by application of heat.

Other compounds, containing a nitro-substituent, in addition to the halogen, are as follows:

Nitro-chlorobenzene
Dinitro-chlorobenzene
p-Nitro benzoyl chloride.

Certain sulphonic acids and sulphonyl chlorides also have the important characteristics of the class of treating agents herein claimed. For example—

2:5 dichlorobenzene sulphonic acid

From the foregoing it will be seen that certain treating agents in the class herein claimed may be relatively complex compounds incorporating, in addition to the halogen-containing residue, other residues such, for instance, as a sulphur-containing residue capable of yielding a sulphur-containing acid upon addition of hydrogen or OH groups, or a nitrogen-containing residue capable of yielding a nitrogen-containing acid upon addition of hydrogen or OH groups. In such cases, the treating agent partakes somewhat of the characteristics of the sulphur- or nitrogen-, as well as of the halogen-containing acid.

In this connection it is pointed out that in copending application Serial No. 461,794 filed concurrently herewith, I have disclosed and claimed other two-radial type treating agents having within the molecule a nitrogen-containing residue. In certain instances, therefore, some of the treating agents herein referred to manifest not only the distinctive characteristics of the group claimed herein, but also characteristics of the group claimed in said copending application.

In carrying out the process, the rosin is heated between about 100° C. and about 350° C., depending upon the agent selected and the degree and nature of modification desired. Most of the organic halogen compounds require at least 200° C. and many of them should be heated above about 250° C. in order to secure appreciable modification of the properties of the rosin.

Anywhere from a trace, for instance, from .01% or .5% up to about 30% by weight of the agent is employed, and I have found a particularly advantageous range with most agents to be from about 2% to about 10%, although many of them are effective between about .5% and 5%.

Thorough dispersion of the modifying agent in the rosin is of importance and appropriate control of temperature and time both contribute to bringing about such thorough dispersion. Agitation may be used as an aid to securing thorough dispersion. Usually not more than a few hours treatment on temperature will be found sufficient, for instance, from about one hour to about five hours, although in some cases the reaction proceeds very rapidly, requiring not more than about one half hour.

Another important consideration is that the reaction is desirably carried out in the absence of air, or out of contact with any substantial quantity of air. For this purpose the reaction may be carried out in a closed vessel, though not necessarily at a positive pressure, so that the gases or fumes of the reaction released from the modifying agent serve to exclude the air.

Vacuum is also effective for the purpose of excluding air, and in addition, reduction in contact of air may be brought about by blanketing the surface of the reaction mixture with some inert gas, such as $SO_2$, $CO_2$, or nitrogen. Where vacuum is used, a pressure, for instance, of about 100 mms. Hg to about 450 mms. Hg will be found effective, although higher or lower may be used. Whatever means or procedure is employed, it is of advantage to so conduct the process as to reduce oxygen concentration in the reaction vessel and prevent entrance of fresh air or oxygen to the reaction mixture.

Some more or less general considerations regarding the process should be noted, as follows:

Although the complete mechanism of modification may not be fully understood, it may be mentioned that rosin is an organic isocolloid, i. e., a colloidal system in which the dispersed phase and the dispersion medium are both of the same chemical compositions, though present in different physical states.

By modification I believe that the relationship or relative proportions of the dispersed phase and dispersion medium may be altered. Moreover, the modification process apparently also involves decarboxylation, the extent of which is usually incomplete.

Possibly also non-volatile aggregates or polymers are formed.

Some of the foregoing effects or reactions (particularly with respect to the physical consistency of the modified product and/or the acid value) may work in one direction and others in the opposite direction. For example, the end melting point may be the differential result of the liquefying action of the modifying agent and of one or more other effects, for instance, aggregation or polymerization, which usually tend to raise the melting point.

In considering the nature of the modifications, it is to be noted that, while some small loss in weight may occur by volatilization (usually not more than about 15-20%), no appreciable fractional or destructive distillation takes place. With appropriate precautions to avoid distillation the process can usually be carried out without loss of more than 5% or 10%, such small loss as does occur usually comprising water, $CO_2$, etc., at least in major part. As a precaution, the temperature should be kept below the boiling or distillation point of the main reaction product, under the applied reaction conditions of the process. By this precaution, destructive distillation or cracking is positively avoided.

The modified rosin product is quite unique, since the rosin molecule retains almost as many carbon atoms as are present in the initial basic constituents of the rosin, the number of carbon atoms being reduced only by that number involved in the decarboxylation. Still further, the types of constituents of the modified rosin are very few in number, probably not more than two or three, and these constituents are characterized by boiling points all lying within a narrow and relatively high temperature range, as can be demonstrated by subsequent distillation of the modified products. The modified products, for practical purposes, are non-volatile when exposed to the air.

It is of importance in securing various of the foregoing characteristics that the reaction take place without any appreciable concurrent distillation. In addition, the absence of air and/or control of temperature are important in avoiding destructive distillation.

Whatever the exact nature of the chemical, colloidal and/or physical changes which are brought about, in general the treatment provided in accordance with the present invention reduces the acid value of the modified product and also softens or liquefies the material. These changes, together with others which usually take place, such as imparting drying characteristics to the rosin, and improving film forming properties of the modified products as compared with untreated rosin in the absence of other vehicle solids, for instance, make possible or practicable use of my modified rosin products for many purposes for which rosin in its natural state is not suited, or at least not well adaptable, and for which many known rosin derivatives are likewise not satisfactory.

By appropriate selection of modifying agent and treatment conditions, such as temperature, time, vacuum, etc., I am enabled to control various physical properties of the modified product, and notably the acid value, saponification value and physical consistency. In general the most valuable modified products have, for instance, a saponification value not exceeding 120.

EXAMPLES

In a table given herebelow, there are reproduced the results of some comparative experiments which were conducted under the same conditions, except for certain designated changes which serve to illustrate differences in properties which may be secured by variations in process.

In all cases the experiments of this comparative series employed 5% of the organic halogen compound and in all cases the treatment was conducted on WW wood rosin (Newport Industries), 1,000 gms. of the rosin being heated in a three liter distilling flask, under a pressure of about 400 mms. Hg. The treatment period was 5 hours. The treatment temperature was about 290° C. and was maintained fairly close to that figure throughout the 5 hour treatment period (usually within 10° C. plus or minus).

All temperatures are given in degrees centigrade.

*Table of comparative experiments*

| Ex. No. | Agent | Acid value | Iodine value | Melting point | Consistency |
|---|---|---|---|---|---|
| | | | | *Degrees* | |
| 1 | Monochloracetic acid | 98.6 | 167.4 | | Plastic. |
| 2 | Trichloracetic acid | 93.5 | | | Do. |
| 3 | Naphthalene tetrachloride | 105.0 | | 48 | Do. |
| 4 | Beta-chloroanthraquinone | 106.0 | | | Do. |
| 5 | 2,2,3-trichlorobutyric acid | 100.3 | 162.5 | | Do. |
| 6 | Pentachloropentane | 111.4 | 164.5 | | Do. |
| 7 | Benzoyl chloride | 114.6 | 161.0 | | Do. |
| 8 | p-Nitrobenzoyl chloride | 111.8 | 150.6 | 66.1 | Very slightly plastic. |
| 9 | Tetrachloro-resorcinol | 49.4 | 130.0 | | Liquid. |
| 10 | Tetrabromofluorescein | 72.6 | 125.1 | | Plastic to liquid. |
| 11 | Iodoform | 82.1 | 86.5 | | Plastic to heavy liquid. |
| A | (WW wood rosin without any treatment) | 169.0 | 206.2 | 81 | Brittle solid. |
| B | (Heated without agent) | 120.3 | 150.8 | 68 | Do. |

The designations under the "Consistency" column may be further explained and amplified as follows:

Solid=consistency harder than that on which an impression can be made with the finger nail.

Slightly plastic=consistency such that an impression can be made with the finger nail, sometimes also displaying some degree of "cold flow."

Plastic=consistency such that the material may with ease be deformed with the finger and manifesting free "cold flow" characteristics.

Liquid=consistency ranging from that of "plastic" defined just above, to that of an oil, such as a three-hour kettle bodied linseed oil, the viscosity sometimes being down as far as about M on the Gardner scale or even somewhat lower.

At the bottom of the table above, the two examples lettered A and B indicate the following:

A—The same WW wood rosin as used in all of the other experiments, so as to indicate the acid value, melting point and consistency of this rosin in its initial untreated state.

B—Blank experiment carried out under all of the conditions applied to the other experiments, except that no treating agent was employed during the heating.

In determining melting point, the mercury method was used. No melting point determinations were made on "plastic" or softer products because of the impracticability of securing accurate results.

The inclusion of items A and B in the above table will facilitate analysis of the effects secured by employment of various different modifying agents. The blank experiment B should be compared with various of the numbered experiments conducted at 290° C.

Certain of the agents mentioned above are particularly effective in liquefying rosin, for instance, iodoform, tetrabromofluorescein (eosin) and tetrachlororesorcinol.

In general, the modifying agents of the present application are advantageous from the standpoint of the color of the products produced. Most of the products are of quite light color, and therefore of especial usefulness for certain purposes, such as in varnishes.

Certain variations in procedure may be adopted. For example, instead of using vacuum during the treatment period, other procedure may be adopted with a view to excluding air from the reaction. The form of the reaction vessel employed may be such that gases evolved from the reaction will serve to effectively exclude air, without applying vacuum. Furthermore, certain gases, such as $SO_2$, $CO_2$ or nitrogen can be either bubbled through the reaction mass or employed as a blanket on the surface of the batch undergoing treatment. Expedients of this type not only serve to exclude the air from the reaction but may also be utilized for their supplemental effect on the material being treated, this subject being more fully considered in my copending application Serial No. 318,650, filed February 12, 1940, of which the present application is a continuation-in-part. It is here further noted that certain features herein disclosed are also disclosed in my prior U. S. applications Serial No. 386,371, filed April 1, 1941 (now Patent No. 2,311,200) and Serial No. 359,425 (now Patent No. 2,213,944).

Moreover, as disclosed in the above mentioned copending applications, still other variations in process made be employed for a number of different purposes, but it is not thought necessary to discuss these fully herein, since reference may be made to the copending applications for that purpose. In passing, however, it is noted that additional treating agents, of a supplemental character, may also be present during the reaction, among which might be mentioned dissolution promoting agents of the type disclosed in my issued Patent No. 2,293,038. Various combinations of modifying agents may also be used for different purposes, including combinations of the modifying agents above disclosed, as well as combinations of the modifying agents herein disclosed with agents disclosed in other of my applications mentioned above as well as hereinafter.

It is further to be noted that in general increasing any one or all of the variables; namely, temperature, time of treatment and percentage of modifying agent, increases the extent of modification. It will be understood that the foregoing is a general rule normally applicable within the ranges of operation above indicated, although, as to at least some variables, there may be limits beyond which the general rule does not apply. For instance, excessive increase in temperature may substantially alter the character of the process, as by destructively distilling the product.

In considering the starting material on which the process may be employed, it is first noted that the process brings about changes both of a colloidal and also of a chemical nature. It is important, however, to bear in mind that the process essentially involves a reaction with the rosin molecule, that is, with the type of molecules of which the basic constituents of natural rosin are composed. Therefore, while rosin itself, such as gum or wood rosins, represents perhaps the most important starting material to which the process is adaptable, it is noted that the process may be employed on rosin which has been pretreated in various ways, or on mixed or chemically condensed materials incorporating rosin, since the reaction will take place wherever the rosin molecule is present provided, of course, that the physical or chemical state of "environment" of the rosin molecule is not such as to prevent the reaction from taking place.

It may also be mentioned that there are other natural resins, such as copals, which act similarly to rosin by treatment in accordance with this invention. In fact, the reaction may be carried out on any of the natural resins containing high molecular resin acids. Therefore, wherever any such other natural resins behaves similarly to rosin, it is herein considered as an equivalent.

Copals are fossil gums which have to be "fused" before becoming soluble in organic solvents and miscible with fatty oil. When copals are used in the present process, they should be employed in the fused state.

The modified product of this invention may if desired, be subject to other treatment, depending upon the use for which it is intended. Thus, for example, the modified products may be vulcanized with sulphur. The modified resin products secured in accordance with the foregoing, may be vulcanized as such, or in solutions, such as varnish solutions (in the latter case with sulphur chloride).

Further, they may be converted into emulsions and used for various purposes in that form.

In the event sulphur or other sulphur-like vulcanizing agents are used, vulcanization, for certain purposes, is desirably carried out at temperatures between about 120° C. and 200° C. For purposes where vulcanization is to be effected at lower temperatures, for instance, at room temperature, sulphur chloride, or similarly acting vulcanizing agents, should be used. In instances where the vulcanization is carried out in a varnish solution, the sulphur chloride treatment is especially practical.

As is mentioned in my copending application Serial No. 386,371, filed April 1, 1941, the modified rosin products may be subject to still other supplemental treatments, such for instance as esterification, as by treating with glycerine or other polyhydric alcohols, such as glycols, pentaerythritol, mannitol, sorbitol, etc.

The vulcanized liquefied resin products made in accordance with the invention have valuable properties for a number of purposes including the making of protective coatings, some of these vulcanized products being useful as plasticizers for coating compositions and plastics.

I claim:

A process for making a modified and softened rosin product from hard and brittle rosin, which process comprises dispersing in the rosin from 0.5% to 10% of tetrachloro, resorcinol, and dissolving said compound in and reacting said compound with the rosin by heating the mixture out of contact with the atmosphere between about 200° C. and 350° C., but not above the temperature at which appreciable destructive distillation occurs under the conditions of the treatment, the heating being continued until the resultant mixture has reduced acid value and melting point as compared with the acid value and melting point of the same rosin heated to the same temperature under the same treatment conditions but without a decarboxylation promoting agent.

LÁSZLÓ AUER.

CERTIFICATE OF CORRECTION.

Patent No. 2,380,141. July 10, 1945.

LÁSZLÓ AUER.

It is hereby certified that error appears in the printed specification of the above numbered patent requiring correction as follows: Page 2, second column, line 70, for "two-radial" read --two-radical--; page 4, second column, line 38, for "made" read --may--; page 5, first column, line 8, for "state of" read --state or--; line 17, for "resins" read --resin--; and second column, line 24, after "tetrachloro" strike out the comma; and that the said Letters Patent should be read with this correction therein that the same may conform to the record of the case in the Patent Office.

Signed and sealed this 23rd day of October, A. D. 1945.

Leslie Frazer (Seal) First Assistant Commissioner of Patents.

important starting material to which the process is adaptable, it is noted that the process may be employed on rosin which has been pretreated in various ways, or on mixed or chemically condensed materials incorporating rosin, since the reaction will take place wherever the rosin molecule is present provided, of course, that the physical or chemical state of "environment" of the rosin molecule is not such as to prevent the reaction from taking place.

It may also be mentioned that there are other natural resins, such as copals, which act similarly to rosin by treatment in accordance with this invention. In fact, the reaction may be carried out on any of the natural resins containing high molecular resin acids. Therefore, wherever any such other natural resins behaves similarly to rosin, it is herein considered as an equivalent.

Copals are fossil gums which have to be "fused" before becoming soluble in organic solvents and miscible with fatty oil. When copals are used in the present process, they should be employed in the fused state.

The modified product of this invention may if desired, be subject to other treatment, depending upon the use for which it is intended. Thus, for example, the modified products may be vulcanized with sulphur. The modified resin products secured in accordance with the foregoing, may be vulcanized as such, or in solutions, such as varnish solutions (in the latter case with sulphur chloride).

Further, they may be converted into emulsions and used for various purposes in that form.

In the event sulphur or other sulphur-like vulcanizing agents are used, vulcanization, for certain purposes, is desirably carried out at temperatures between about 120° C. and 200° C. For purposes where vulcanization is to be effected at lower temperatures, for instance, at room temperature, sulphur chloride, or similarly acting vulcanizing agents, should be used. In instances where the vulcanization is carried out in a varnish solution, the sulphur chloride treatment is especially practical.

As is mentioned in my copending application Serial No. 386,371, filed April 1, 1941, the modified rosin products may be subject to still other supplemental treatments, such for instance as esterification, as by treating with glycerine or other polyhydric alcohols, such as glycols, pentaerythritol, mannitol, sorbitol, etc.

The vulcanized liquefied resin products made in accordance with the invention have valuable properties for a number of purposes including the making of protective coatings, some of these vulcanized products being useful as plasticizers for coating compositions and plastics.

I claim:

A process for making a modified and softened rosin product from hard and brittle rosin, which process comprises dispersing in the rosin from 0.5% to 10% of tetrachloro, resorcinol, and dissolving said compound in and reacting said compound with the rosin by heating the mixture out of contact with the atmosphere between about 200° C. and 350° C., but not above the temperature at which appreciable destructive distillation occurs under the conditions of the treatment, the heating being continued until the resultant mixture has reduced acid value and melting point as compared with the acid value and melting point of the same rosin heated to the same temperature under the same treatment conditions but without a decarboxylation promoting agent.

LÁSZLÓ AUER.

CERTIFICATE OF CORRECTION.

Patent No. 2,380,141.   July 10, 1945.

LÁSZLÓ AUER.

It is hereby certified that error appears in the printed specification of the above numbered patent requiring correction as follows: Page 2, second column, line 70, for "two-radial" read --two-radical--; page 4, second column, line 38, for "made" read --may--; page 5, first column, line 8, for "state of" read --state or--; line 17, for "resins" read --resin--; and second column, line 24, after "tetrachloro" strike out the comma; and that the said Letters Patent should be read with this correction therein that the same may conform to the record of the case in the Patent Office.

Signed and sealed this 23rd day of October, A. D. 1945.

Leslie Frazer (Seal)   First Assistant Commissioner of Patents.